(12) United States Patent
Kakura et al.

(10) Patent No.: US 6,366,612 B1
(45) Date of Patent: Apr. 2, 2002

(54) AUTOMATIC EQUALIZER

(75) Inventors: Yoshikazu Kakura; Tomoki Osawa, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/120,830

(22) Filed: Jul. 22, 1998

(30) Foreign Application Priority Data

Jul. 23, 1997 (JP) .............................................. 9-196269

(51) Int. Cl.[7] .............................. H03H 7/30; H03H 7/40; H03K 5/159
(52) U.S. Cl. ....................................................... 375/230
(58) Field of Search .................................. 375/229, 230, 375/233; 708/323; 333/28 R, 18

(56) References Cited

U.S. PATENT DOCUMENTS 4,789,994 A  * 12/1988  Randall et al.
5,068,873 A  * 11/1991  Murakami
5,303,263 A  *  4/1994  Shoji et al.

* cited by examiner

*Primary Examiner*—Jean Corrielus
(74) *Attorney, Agent, or Firm*—Ostrolenk, Faber, Gerb & Soffen, LLP

(57) ABSTRACT

An automatic equalizer that can realize high-quality signal equalization without erroneous decision in the environment where a sequence candidate tends to be erroneously selected due to noises because the component corresponding to a demodulation point is close to the precursor component in magnitude. The automatic equalizer outputs the absolute values of impulse response signals, determines as candidate signals response absolute value signals larger than a threshold value, selects as a demodulation point a point corresponding to a candidate signal with the smallest propagation value among the candidate signals, and decides the selected point as a demodulation point setting signal.

11 Claims, 11 Drawing Sheets

AUTOMATIC EQUALIZER

BACKGROUND OF THE INVENTION

The present invention relates to an automatic equalizer, and more particularly to an automatic equalizer that automatically equalizes signals distorted due to intersymbol interference.

Conventionally, there has been a decision feedback-type automatic equalizer as an automatic equalizer. In some decision feedback-type automatic equalizers, as shown in the flowchart of FIG. 11, the absolute values of impulse response signals are obtained (refer to the step 201) and then an impulse response with the largest power is decided as a demodulation point (refer to the step 1001). Thus received signals are equalized by calculating estimated received signals using both decision outputs for a postcursor component and transmission signal sequences for a precursor component. Then the filter coefficients are decided such that the demodulation point corresponds to an impulse response with the largest power.

However, when such an automatic equalizer estimates a received signal Sr with a relatively large precursor component, wrong selection of a sequence candidate due to noises occurs easily, thus resulting in degradation in quality. The reason is that there is no noticeable difference between estimated precursor values even if the corresponding symbols are interchanged when the magnitude of the precursor component is close to that of the component corresponding to a demodulation point.

SUMMARY OF THE INVENTION

The objective of the present invention is to solve the above-mentioned problem.

Moreover, the objective of the invention is to provide an automatic equalizer that can perform high-quality signal equalization.

Furthermore, the objective of the present invention is to provide an automatic equalizer that.

The objective of the present invention is achieved by an automatic equalizer comprising a decision unit for subjecting N estimated received signals to a receive code decision and then outputting a decision result as a decision output signal; an impulse response calculation circuit for outputting impulse response signals in response to received signals; a demodulation point setting circuit for outputting a demodulation point setting signal in response to the impulse response signals, the demodulation point setting signal shifting a demodulation point from a point where the absolute value of the impulse response signal is maximized; a filter coefficient output circuit for outputting a first filter coefficient group and a second filter coefficient group in response to the impulse response signals and the demodulation point setting signal, the first filter coefficient group corresponding to a postcursor component in the impulse response signals, the second filter coefficient group corresponding to a precursor component in the impulse response signals; a transversal filter for estimating the postcursor component of the received signal in response to the decision output signals and the first filter coefficient group to output a estimated postcursor signal; a transmission signal sequence generator for producing N transmission signal sequences; a estimated precursor circuit for estimating a precursor component of the received signal in response to the second filter coefficient group and the N transmission signal sequences and then outputting N estimated precursor signals; and an adder for adding said estimated postcursor signal and each of the N estimated precursor signals to output said N estimated received signals.

In the automatic equalizer according to the present invention, the decision circuit comprises a subtracter for providing differences between the received signal and the N estimated received signals to output N estimation error signals; and a minimum error decision unit for outputting as a decision output signal a part of a transmission signal sequence corresponding to an estimated received signal with a minimum absolute value among the N estimated received signals.

In the automatic equalizer according to the present invention, the demodulation point setting circuit comprises means for outputting as a response absolute value signal the absolute value signal of the impulse response signal; means for determining as a candidate signal the response absolute value signal with a larger absolute value than a threshold value; and means for selecting as a demodulation point a point corresponding to a candidate signal with the smallest propagation delay among the candidate signals to decide the demodulation point setting signal.

In the automatic equalizer according to the present invention, the demodulation point setting circuit comprises means for outputting as a response absolute value signal the absolute value of the impulse response signal; means for selecting as a demodulation point candidate signal a signal with the largest absolute value among response absolute value signals; means for outputting a weighted demodulation point candidate signal by multiplying the demodulation point candidate signal by a first weight coefficient; means for outputting a weighted selected response absolute value signal by multiplying the response absolute value signal with a smaller propagation delay than the propagation delay of the demodulation point candidate signal by a second weight coefficient; and means for comparing the weighted demodulation point candidate signal with the weighted selected response absolute value signal, and then for deciding the demodulation point setting signal being a point corresponding to the demodulation point candidate select signal when the weighted demodulation point candidate signal is larger than all of the weighted selected response absolute value signals and for updating the demodulation point candidate signal to a response absolute value signal with the propagation delay next larger than that of the demodulation point signal when the weighted demodulation point candidate signal is smaller than all of the weighted selected response absolute value signals; wherein the demodulation point setting signal is recursively decided.

In the automatic equalizer according to the present invention, the demodulation point setting circuit comprises means for outputting as a response absolute value signal the absolute value signal of the impulse response signal; means for selecting as a demodulation point candidate signal a signal with the largest absolute value among response absolute value signals; means for outputting a weighted demodulation point candidate signal by multiplying the demodulation point candidate signal by a first weight coefficient; means for outputting a weighted selected response absolute value signal by multiplying the selected response absolute value signal by a second weight coefficient, the number of the selected response absolute value signal equals to a value obtained by subtracting 1 from the number of taps of the estimated precursor circuit and the selected response absolute signals are larger propagation delay among the response absolute value signals with a smaller propagation delay than that of the demodulation point candidate signal; and means for comparing the weighted demodulation point candidate signal with the weighted select response absolute value signal, and then for deciding the demodulation point setting signal being a point corresponding to the demodulation point candidate select signal when the weighted demodulation point candidate signal is larger than all of the weighted selected response absolute value signals and for updating the demodulation point candidate signal to a response absolute value signal with the propagation delay next larger than that of the demodulation point signal when the weighted demodulation point candidate signal is smaller than all of the weighted selected response absolute value signals; wherein the demodulation point setting signal is recursively decided.

In the automatic equalizer according to the present invention, the demodulation point setting circuit comprises means for outputting as a response absolute value signal the absolute value signal of the impulse response signal; means for determining as a candidate signal the response absolute value signal with a larger absolute value than a threshold value; means for selecting as a demodulation point candidate signal a signal with the largest absolute value among response absolute value signals; means for outputting a weighted demodulation point candidate signal by multiplying the demodulation point candidate signal by a first weight coefficient; means for outputting a weighted selected response absolute value signal by multiplying the response absolute value signal with a smaller propagation delay than that of the demodulation point candidate signal by a second weight coefficient; and means for comparing the weighted demodulation point candidate signal with the weighted selected response absolute value signal, and then for deciding the demodulation point setting signal being a point corresponding to the demodulation point candidate select signal when the weighted demodulation point candidate signal is larger than all of the weighted selected response absolute value signals and for updating the demodulation point candidate signal to a candidate signal with the propagation delay next larger than that of the demodulation point signal when the weighted demodulation point candidate signal is smaller than all of the weighted selected response absolute value signals; wherein the demodulation point setting signal is recursively decided.

In the automatic equalizer according to the present invention, the demodulation point setting circuit comprises means for outputting as a response absolute value signal the absolute value signal of the impulse response signal; means for determining as a candidate signal the response absolute value signal with a larger absolute value than a threshold value; means for selecting as a demodulation point candidate signal a signal with the largest absolute value among candidate signals; means for outputting a weighted demodulation point candidate signal by multiplying the demodulation point candidate signal by a first weight coefficient; means for outputting a weighted selected response absolute value signal by multiplying the selected response absolute value signal by a second weight coefficient, the number of the selected response absolute value signal equals to a value obtained by subtracting 1 from the number of taps of the estimated precursor circuit and the selected response absolute signals are larger propagation delay among the response absolute value signals with a smaller propagation delay than that of the demodulation point candidate signal; and means for comparing the weighted demodulation point candidate signal with the weighted selected response absolute value signal, and then for deciding the demodulation point setting signal being a point corresponding to the demodulation point candidate selected signal when the weighted demodulation point candidate signal is larger than all of the weighted selected response absolute value signals and for updating the demodulation point candidate signal to a candidate signal with the propagation delay next larger than that of the demodulation point signal when the weighted demodulation point candidate signal is smaller than all of the weighted selected response absolute value signals; wherein the demodulation point setting signal is recursively decided.

In the automatic equalizer according to the present invention, the demodulation point setting circuit comprises means for outputting as a response absolute value signal the absolute value signal of the impulse response signal; means for selecting as a demodulation point candidate signal a signal with the largest absolute value among response absolute value signals; means for outputting a weighted demodulation point candidate signal by multiplying the demodulation point candidate signal by a first weight coefficient; means for outputting a weighted addition signal by multiplying the addition of the response absolute value signal with a smaller propagation delay than that of the demodulation point candidate signal by a second weight coefficient, and means for comparing the weighted demodulation point candidate signal with the weighted addition signal, and then for deciding the demodulation point setting signal being a point corresponding to the demodulation point candidate select signal when the weighted demodulation point candidate signal is larger than the weighted addition signal and for updating the demodulation point candidate signal to a response absolute value signal with the propagation delay next larger than that of the demodulation point signal when the weighted demodulation point candidate signal is smaller than the weighted addition signal; wherein the demodulation point setting signal is recursively decided.

In the automatic equalizer according to the present invention, the demodulation point setting circuit comprises means for outputting as a response absolute value signal the absolute value of the impulse response signal; means for determining as a candidate signal the response absolute value signal with a larger absolute value than a threshold value; means for selecting as a demodulation point candidate signal a signal with the largest absolute value among response absolute value signals; means for outputting a weighted demodulation point candidate signal by multiplying the demodulation point candidate signal by a first weight coefficient; means for outputting a weighted addition signal by multiplying a signal by a second weight coefficient, the signal obtained by adding response absolute value signals with a smaller propagation delay than that of the demodulation point candidate signal; and means for comparing the weighted demodulation point candidate signal with the weighted addition signal, and then for deciding the demodulation point setting signal being a point corresponding to the demodulation point candidate select signal when the weighted demodulation point candidate signal is larger than weighted addition signals and for updating the demodulation point candidate signal to a candidate signal with the propagation delay next larger than that of the demodulation point signal when the weighted demodulation point candidate signal is smaller than the weighted addition signals; wherein the demodulation point setting signal is recursively decided.

In the automatic equalizer according to the present invention, the demodulation point setting circuit comprises means for outputting as a response absolute value signal the absolute value of the impulse response signal; means for determining as a candidate signal the response absolute value signal with a larger absolute value than a threshold value; means for selecting as a demodulation point candidate signal a signal with the largest absolute value among response absolute value signals; means for outputting a first weighted addition signal by multiplying a signal by a first weight coefficient, the signal obtained by adding the response absolute value signals with a smaller propagation delay than that of the demodulation point candidate signal; means for outputting a second weighted addition signal by multiplying a signal by a second weight coefficient, the signal obtained by adding response absolute value signals with a larger propagation delay than that of the demodulation point candidate signal; means for outputting a second weighted addition signal by multiplying a signal by a second weighted coefficient, the signal obtained by adding response absolute value signals with a larger propagation delay than that of the demodulation point candidate signal; and means for comparing the first weighted addition signal with the second weighted addition signal, and then for deciding the demodulation point setting signal being a point corresponding to the demodulation point candidate selection signal when the second weighted addition signal is larger than weighted first addition signal and for updating the demodulation point candidate signal to a candidate signal with the propagation delay next larger than that of the demodulation point signal when the second weighted addition signal is smaller than the first weighted addition signal; wherein the demodulation point setting signal is recursively decided.

In the automatic equalizer according to the present invention, the demodulation point setting circuit comprises means for outputting as a response absolute value signal the absolute value of the impulse response signal; means for determining as a candidate signal the response absolute value signal with a larger absolute value than a threshold value; means for selecting as a demodulation point candidate signal a signal with the largest absolute value among response absolute value signals; means for outputting a first weighted addition signal by multiplying a signal by a first weight coefficient, the signal obtained by adding the response absolute value signals in a designated addition range among signals with a smaller propagation delay than that of the demodulation point candidate signal; means for outputting a second weighted addition signal by multiplying a signal by a second weighted coefficient, the signal obtained by adding the response absolute value signals in a designated addition range among signals with a larger propagation delay than that of the demodulation point candidate signal; means for comparing the first weighted addition signal with the second weighted addition signal, and then for deciding the demodulation point setting signal being a point corresponding to the demodulation point candidate selection signal when the second weighted addition signal is larger than the first weighted addition signal and for updating the demodulation point candidate signal to a candidate signal with the propagation delay next larger than that of the demodulation point signal when the second weighted addition signal is smaller than the first weighted addition signal; wherein the demodulation point setting signal is recursively decided.

According to the present invention, in the case where sequence candidate selection is susceptible to noises because the magnitude of a component corresponding to a demodulation point is close to that of a precursor component, the demodulation point setting circuit allocates a first filter coefficient and a second filter coefficient by deciding a demodulation point to weight estimated postcursor. Therefore, it is avoidable that the magnitude of a component corresponding to a demodulation point is close to that of a precursor component. Thus, erroneous sequence candidate selection can be suppressed so that erroneous decision can be reduced.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be described below by referring to the attached drawings.

Figure 1:
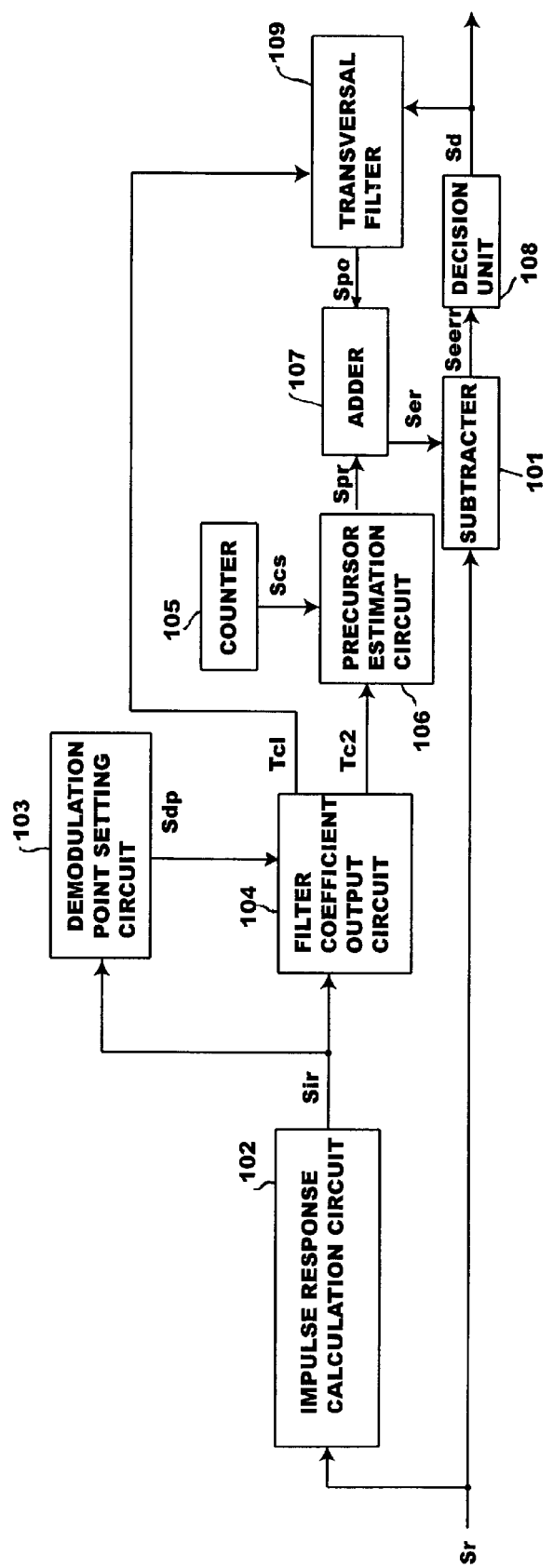
FIG. 1 is a block diagram showing a conventional automatic equalizer.
Figure 13:
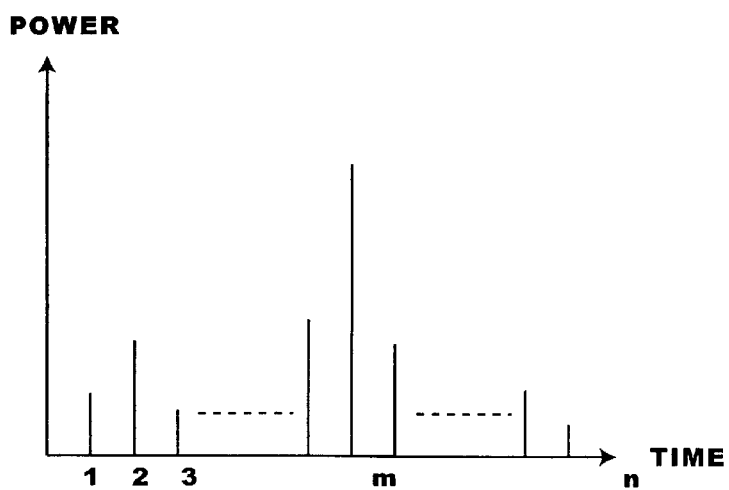
FIG. 13 is a second diagram illustrating an impulse response.

FIG. 1 is a block diagram illustrating an automatic equalizer according to the present invention. Referring to FIG. 1, a subtracter 101 subtracts an estimated received signal Ser from a received signal Sr and then outputs an estimation error signal Seerr. An impulse response calculation circuit 102 obtains impulse responses shown in FIG. 13 based on the received signal Sr and then outputs an impulse response signal Sir. A demodulation point setting circuit 103 decides a demodulation point setting signal Sdp.

A filter coefficient output circuit 104 receives the impulse response signal Sir and the demodulation point setting signal Sdp. Then, if the m-th impulse response has the maximum absolute value among n impulse responses, the filter coefficient output circuit 104 outputs the (m+1)-th to the n-th impulse responses as a filter coefficient group Tc1 and the first to the m-th impulse responses as a filter coefficient group Tc2. A counter 105 outputs a transmission signal sequence Scs represented in a decimal notation ranging 0 to N−1. A estimated precursor circuit 106 estimates the precursor components of the received signal Sr in response to the filter coefficient group Tc2 and the transmission signal sequence Scs and then outputs N estimated precursor signals Spr. An adder 107 adds estimated postcursor signal Spo and each of N estimated precursor signal Spr and then outputs N estimated received signals Ser.

A decision unit 108 decides the least significant bit of a sequence corresponding to an estimation error signal Seerr with the smallest absolute value as a value in which distortion components are removed from the received signal Sr and then outputs it as a decision output signal Sd. The transversal filter 109 receives the decision output signal Sd and the filter coefficient group Tc1 and then outputs the estimated postcursor signal Spo corresponding to the distorted postcursor component. Thus, the distortion containing the precursor component is automatically equalized.

Figure 2:
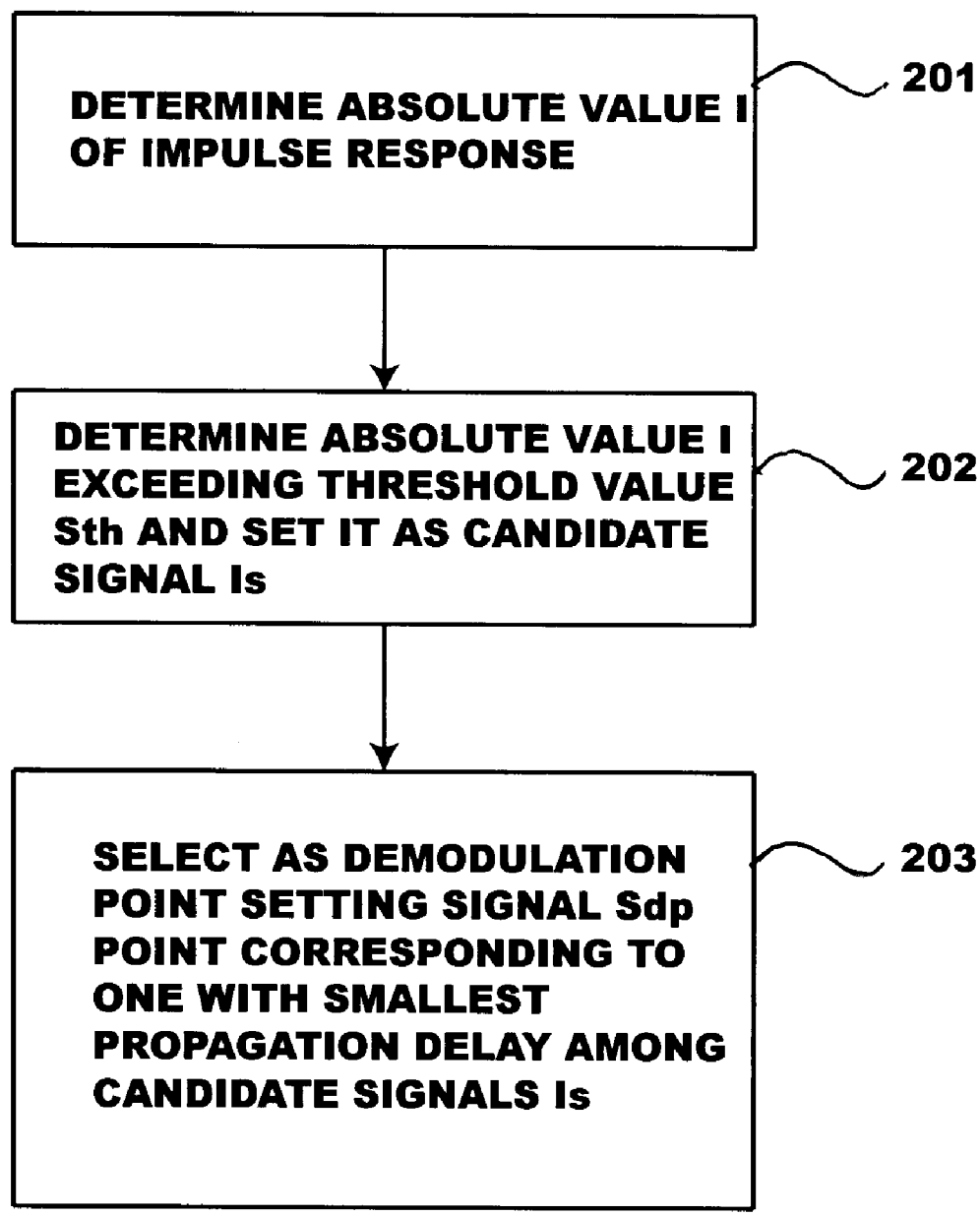
FIG. 2 is a flow chart showing a demodulation point setting procedure according to a first embodiment of the present invention.
Figure 12:
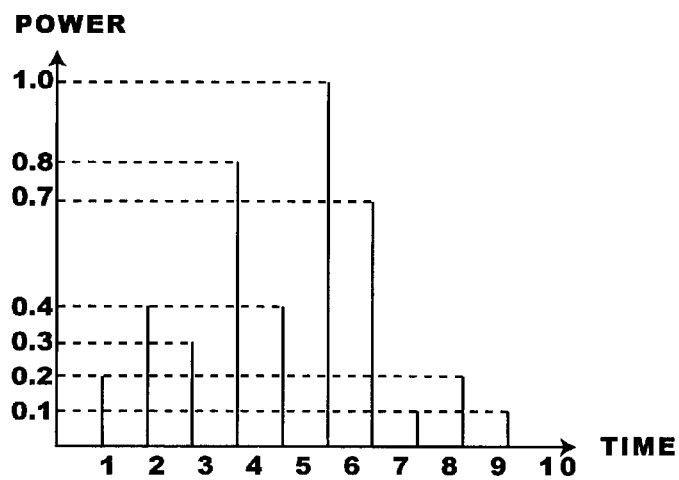
FIG. 12 is a first diagram illustrating an impulse response.

FIG. 2 is a flowchart illustrating the demodulation point setting procedure of the demodulation point setting circuit 103 according to the first embodiment. It is now assumed that the demodulation point is decided to the received signal Sr with the absolute value I of the impulse response shown in FIG. 12. The propagation delays are ranged in the increasing order of I1, I2, . . . , I10 (step 201).

First, the absolute value I exceeding the threshold value Sth is determined as a candidate signal Is (step 202). When the threshold value Sth is 0.6, the absolute values I4, I6, and I7 are selected. The point corresponding to the absolute value I4 with the smallest propagation delay among the three absolute values is selected as a demodulation point to decide a demodulation point setting signal Sdp (step 203).

The above-described operation allows the configuration to reduce erroneous decision when estimated precursor tends to be susceptible to noises, thus realizing high-quality signal equalization.

Figure 3:
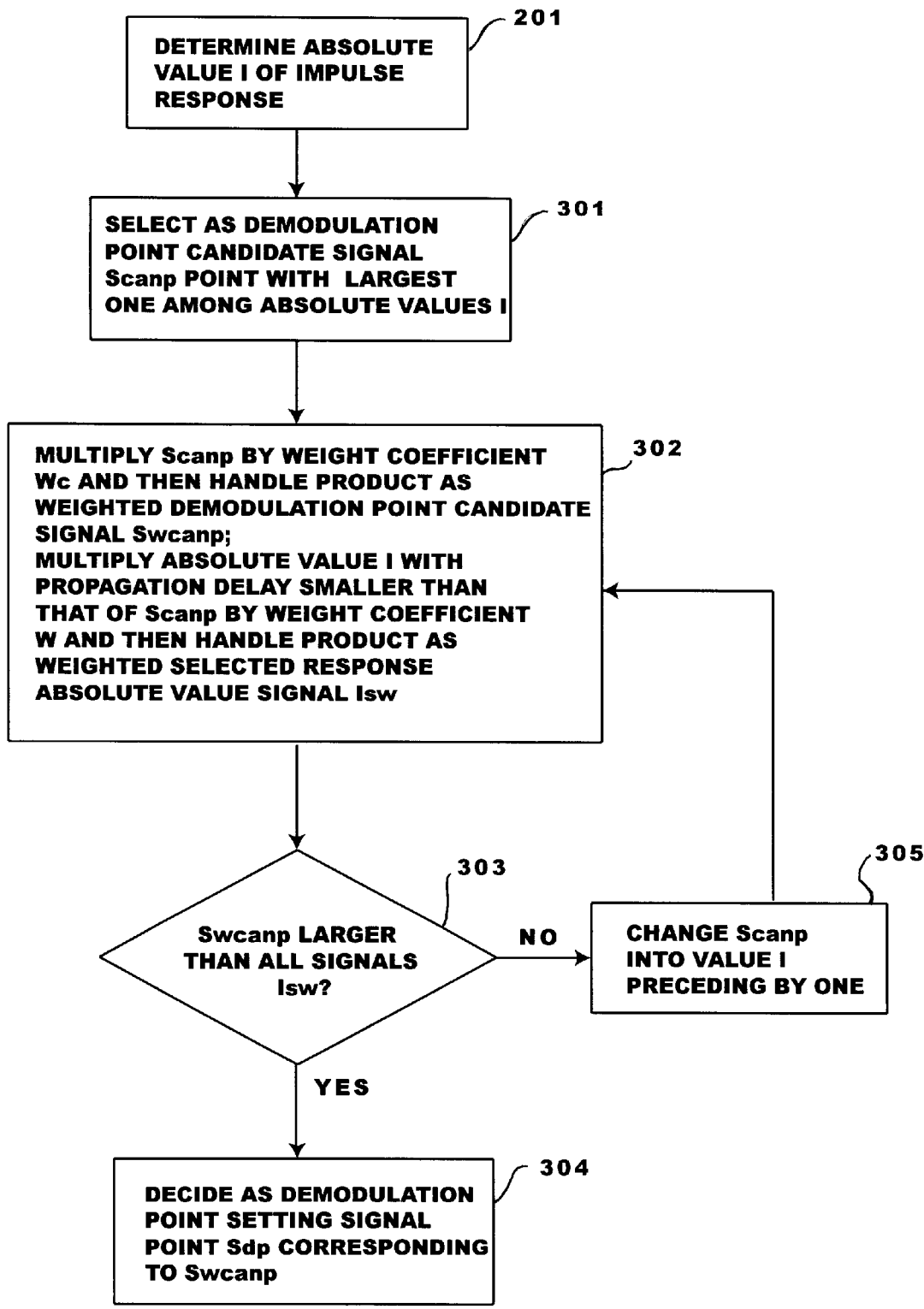
FIG. 3 is a flow chart showing a demodulation point setting procedure according to a second embodiment of the present invention.

FIG. 3 is a flowchart showing the demodulation point setting procedure of the demodulation point setting circuit 103 according to the second embodiment. For example, let us now consider the case where a demodulation point is decided to the received signal Sr with the absolute value I of an impulse response shown in FIG. 12 (step 201). First, a received signal with the largest absolute value I6 is selected as a demodulation point candidate signal Scanp (step 301). Next, the weighted demodulation point candidate signal Swcanp obtained by multiplying the absolute value I6 by the weight coefficient Wc is compared with the weighted selected response absolute value signal Isw obtained by multiplying the absolute values I1 to I5 by the weight coefficient group W (steps 302 and 303).

If Wc=0.6 and W=(W1, W2, W3, W4, W5)=(1.0, 1.0, 1.0, 1.0, 1.0), Swcanp=0.6 and Isw=(Isw1, Isw2, Isw4, Isw5)= (0.2, 0.4, 0.3, 0.8, 0.4). Since the selected response absolute value Isw4 is larger than the weighted demodulation point candidate signal Swcanp, the Scanp is changed to the absolute value I5 preceding by one (step 305). At this time, if Wc=0.6 and W=(W1, W2, W3, W4)=(1.0, 1.0, 1.0, 1.0), Swcanp=0.24 and Isw=(Isw1, Isw2, Isw3, Isw4)=(0.2, 0.4, 0.3, 0.8). Since the selected response absolute value Isw4 is larger than the weighted demodulation point candidate signal Swcanp, the Scanp is changed to the absolute value I4.

If Wc=0.6 and W=(W1, W2, W3), Swcanp=0.48 and Isw =(Isw1, Isw2, Isw3)=(0.2, 0.4, 0.3). Hence, the weighted demodulation point candidate signal Swcanp is larger than all the weighted selected response absolute value signals Isw, the demodulation point setting signal Sdp is decided by selecting the demodulation point corresponding to the absolute value I4 as a demodulation point (step 304).

The above-described operation allows the configuration to reduce erroneous decision when estimated precursor tends to be susceptible to noises, thus realizing high-quality signal equalization.

Figure 4:
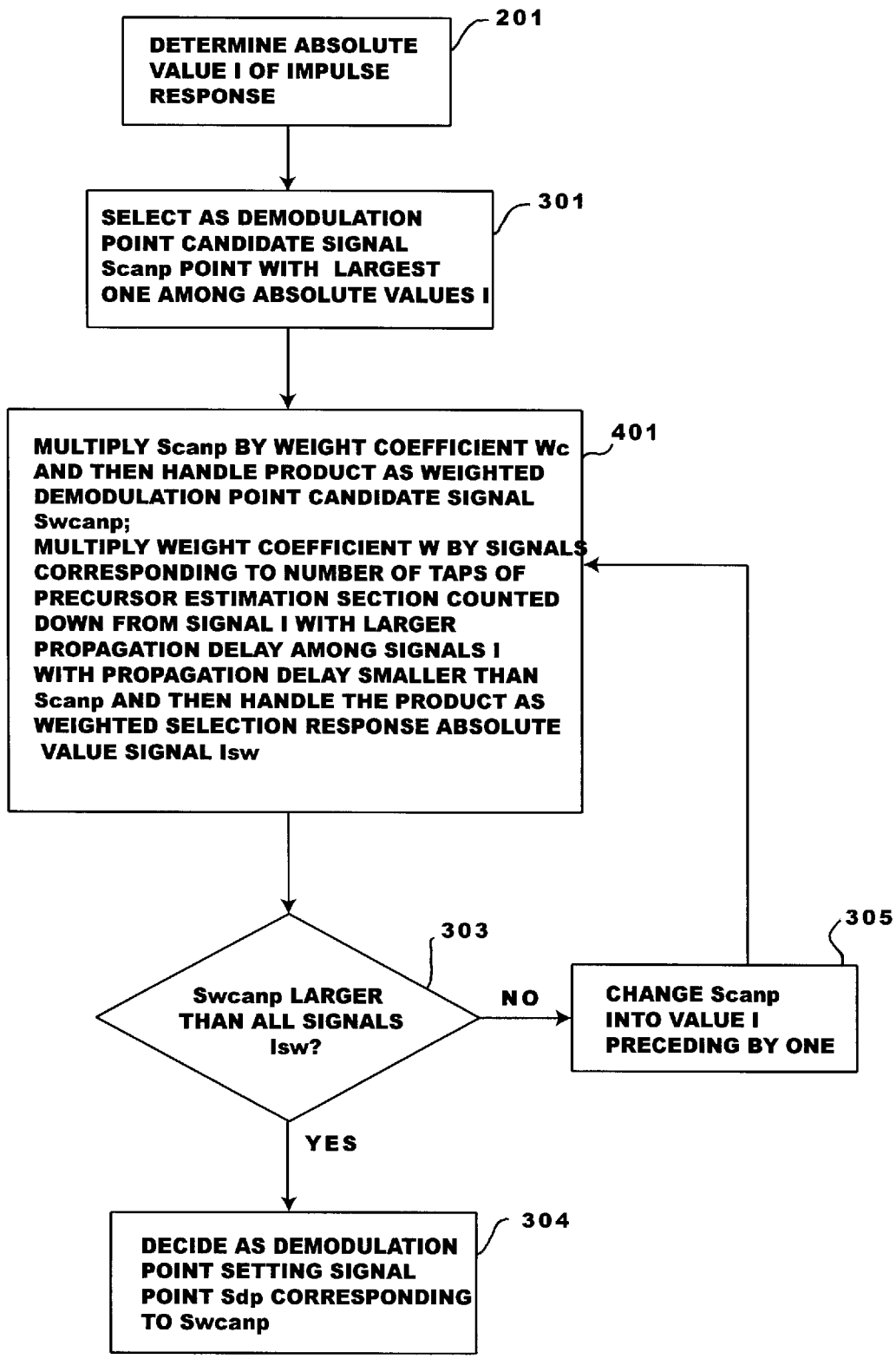
FIG. 4 is a flow chart showing a demodulation point setting procedure according to a third embodiment of the present invention.

FIG. 4 is a flowchart showing the demodulation point setting procedure in the demodulation point setting circuit 103 according to the third embodiment. For example, let us now consider the case where a demodulation point is decided to the received signal Sr with the absolute value I of an impulse response shown in FIG. 12 (step 201). First, a received signal with the largest absolute value I6 is selected as a demodulation point candidate signal Scanp (step 301). Next, the weighted demodulation point candidate signal Swcanp obtained by multiplying the absolute value I6 by the weight coefficient Wc is compared with the weighted selected response absolute value signal Isw obtained by multiplying the absolute values I1 to I5 by the weight coefficient group W (steps 401 and 303).

If the number of taps of the estimated precursor section is 4, Wc=0.6, and W=(W1, W2, W3)=(1.0, 1.0, 1.0), Swcanp= 0.6 and Isw=(Isw1, Isw2, Isw3)=0.3, 0.8, 0.4). Since the weighted selected response absolute value signal Isw2 is larger than the weighted demodulation point candidate signal Swcanp, the demodulation point candidate signal Scanp is changed to the absolute value I5 preceding by one (step 305).

At this time, if Wc=0.6 and W=(W1, W2, W3)=(1.0, 1.0, 1.0), Swcanp=0.24 and Isw=(Isw1, Isw2, Isw3)=(0.4, 0.3, 0.8). Since the selected response absolute value Isw3 is larger than the weighted demodulation point candidate signal Swcanp, the Scanp is changed to the absolute value I4 preceding by one.

If Wc=0.6 and W=(W1, W2, W3)=(1.0, 1.0, 1.0), Swcanp=0.48 and Isw=(Isw1, Isw2, Isw3)=(0.2, 0.4, 0.3). Hence, the weighted demodulation point candidate signal Swcanp is larger than all the absolute value signals Isw, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

Figure 5:
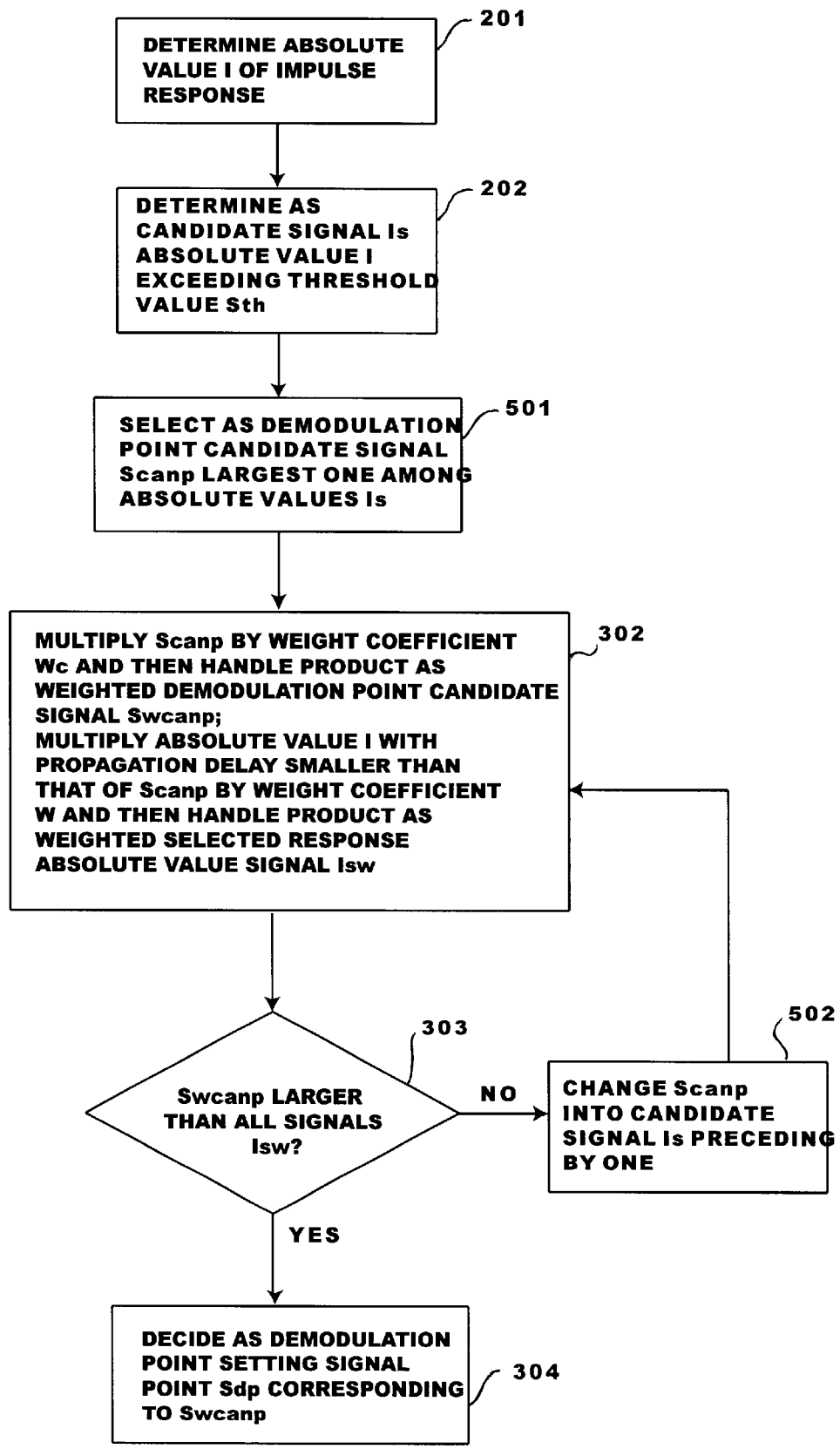
FIG. 5 is a flow chart showing a demodulation point setting procedure according to a fourth embodiment of the present invention.

FIG. 5 is a flowchart showing the demodulation point setting procedure in the demodulation point setting circuit 103 according to the fourth embodiment. For example, let us now consider the case where a demodulation point is decided to the received signal Sr with the absolute value I of an impulse response shown in FIG. 12 (step 201). First, a received signal with the absolute value I exceeding the threshold value Sth is selected as a candidate signal Is (step 202). If the threshold value Sth is 0.6, the absolute values I4, I6 and I7 are selected.

Next, the largest absolute value I6 is selected as a demodulation point candidate signal Scanp (step 501). The weighted demodulation point candidate signal Swcanp obtained by multiplying the largest absolute value I6 by the weight coefficient Wc is compared with the weighted selected response absolute value signal Isw obtained by multiplying the absolute values I1 to I5 by the weight coefficient group W (steps 302 and 303).

If Wc=0.6, and W=(W1, W2, W3, W4, W5)=(1.0, 1.0, 1.0, 1.0, 1.0), Swcanp=0.6, and Isw=(Isw1, Isw2, Isw3, Isw4, Isw5)=0.2, 0.4, 0.3, 0.8, 0.4). Since Isw4 is larger than Swcanp, the demodulation point candidate signal Scanp is changed to the absolute value I4 preceding by one and exceeding the threshold value Sth (step 502).

At this time, if Wc=0.6 and W=(W1, W2, W3)=(1.0, 1.0, 1.0), Swcanp=0.48 and Isw=(Isw1, Isw2, Isw3)=(0.2, 0.4, 0.3). Since Swcanp is larger than all the absolute values Isw, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

Figure 6:
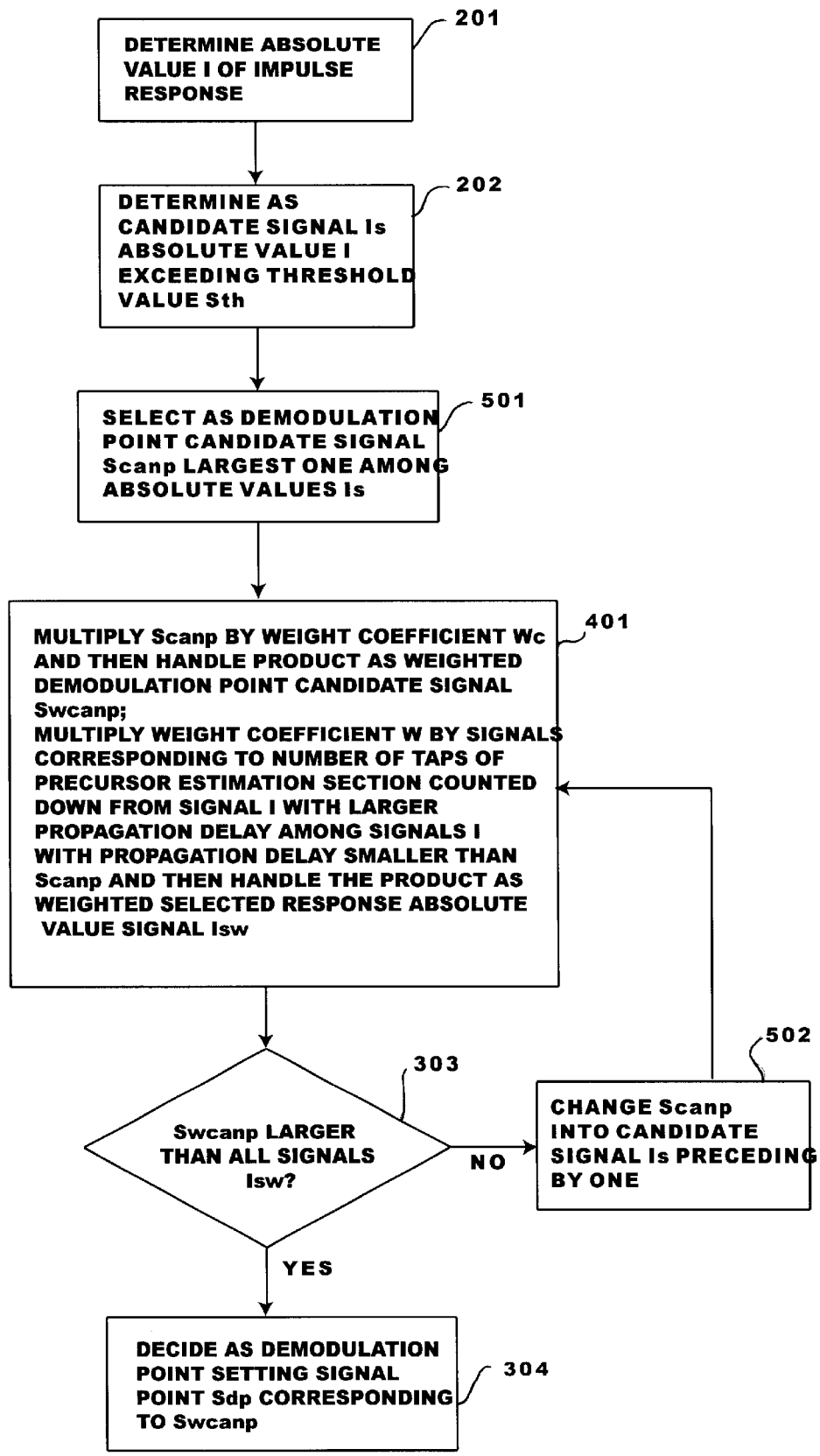
FIG. 6 is a flow chart showing a demodulation point setting procedure according to a fifth embodiment of the present invention.

FIG. 6 is a flowchart showing the demodulation point setting procedure in the demodulation point setting circuit 103 according to the fifth embodiment. For example, let us now consider the case where a demodulation point is decided to the received signal Sr with the absolute value I of an impulse response shown in FIG. 12 (step 201).

First, a received signal with the absolute value I exceeding the threshold value Sth is selected as a candidate signal Scanp (step 202). If the threshold value 5th is 0.6, the absolute values I4, I6, and I7 are selected. Next, the signal with the largest absolute value 16 among the selected absolute values is selected as a demodulation point candidate signal Scanp (step 501). Then, the weighted demodulation point candidate signal Swcanp obtained by multiplying the absolute value I6 by the weight coefficient Wc is compared with the weighted selected response absolute value signal Isw obtained by multiplying the absolute values I1 to I5 by the weight coefficient group W (steps 601 and 303).

If the number of taps of the estimated precursor section is 4, Wc=0.6, and W=(W1, W2, W3)=(1.0, 1.0, 1.0), Swcanp=0.6 and Isw=(Isw1, Isw2, Isw3)=(0.3, 0.8, 0.4). Since Isw2 is larger than Swcanp, the demodulation point candidate signal Scanp is changed to the absolute value I4 preceding by one and exceeding the threshold value 5th (step 502).

At this time, if Wc=0.6 and W=(W1, W2, W3)=(1.0, 1.0, 1.0), Swcanp=0.48 and Isw=(Isw1, Isw2, Isw3)=(0.2, 0.4, 0.3). Since the weighted demodulation point candidate signal Swcanp is larger than all the absolute values Isw, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

Figure 7:
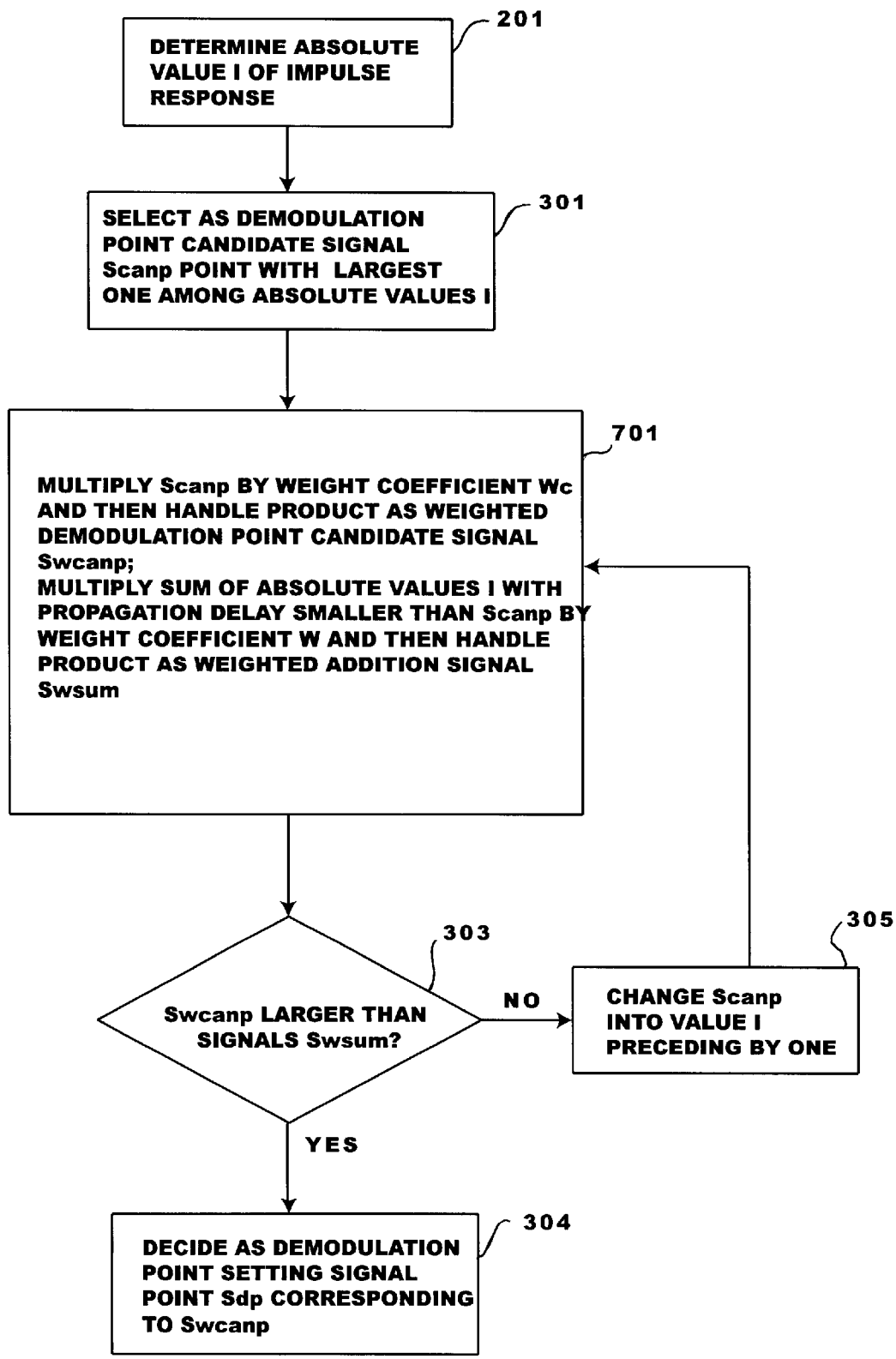
FIG. 7 is a flow chart showing a demodulation point setting procedure according to a sixth embodiment of the present invention.

FIG. 7 is a flowchart showing the demodulation point setting procedure in the demodulation point setting circuit 103 according to the sixth embodiment. For example, let us now consider the case where a demodulation point is decided to the received signal Sr with the absolute value I of an impulse response shown in FIG. 12 (step 201).

First, the signal with the largest absolute value I6 is selected as a demodulation point candidate signal Scanp (step 301). The weighted demodulation point candidate signal Swcanp obtained by multiplying the largest absolute value I6 by the weight coefficient Wc is compared with the weighted addition signal Swsum obtained by multiplying the sum 2.1 of the absolute values I1 to I5 by the weight coefficient W (steps 701 and 303).

If Wc=1.0 and W=0.6, Swcanp=1.0 and Swsum=1.26. Since the weighted addition signal Swsum is larger than the weighted demodulation point candidate signal Swcanp, the weighted demodulation point candidate signal Swcanp is changed to IS preceding by one (step 305). At this time, when Wc=1.0 and W=0.6, the sum of the absolute values I1 to I4 is 1.7 so that Swcanp=0.4 and Swsum=1.02. Since Swsum becomes larger than Swcanp, the demodulation point candidate signal Scanp is changed to I4 preceding by one. At this time, when Wc=1.0 and W=0.6, the sum of the absolute values I1 to I3 is 0.9 in total so that Swcanp=0.8 and Swsum=0.54. Since Swcanp becomes larger than Swsum, the demodulation point setting signal Sdp is decided by selecting the point corresponding to I4 as a demodulation point (step 304).

The above-described operation allows the configuration to reduce erroneous decision when estimated precursor tends to be susceptible to noises, thus realizing high-quality signal equalization.

Figure 8:
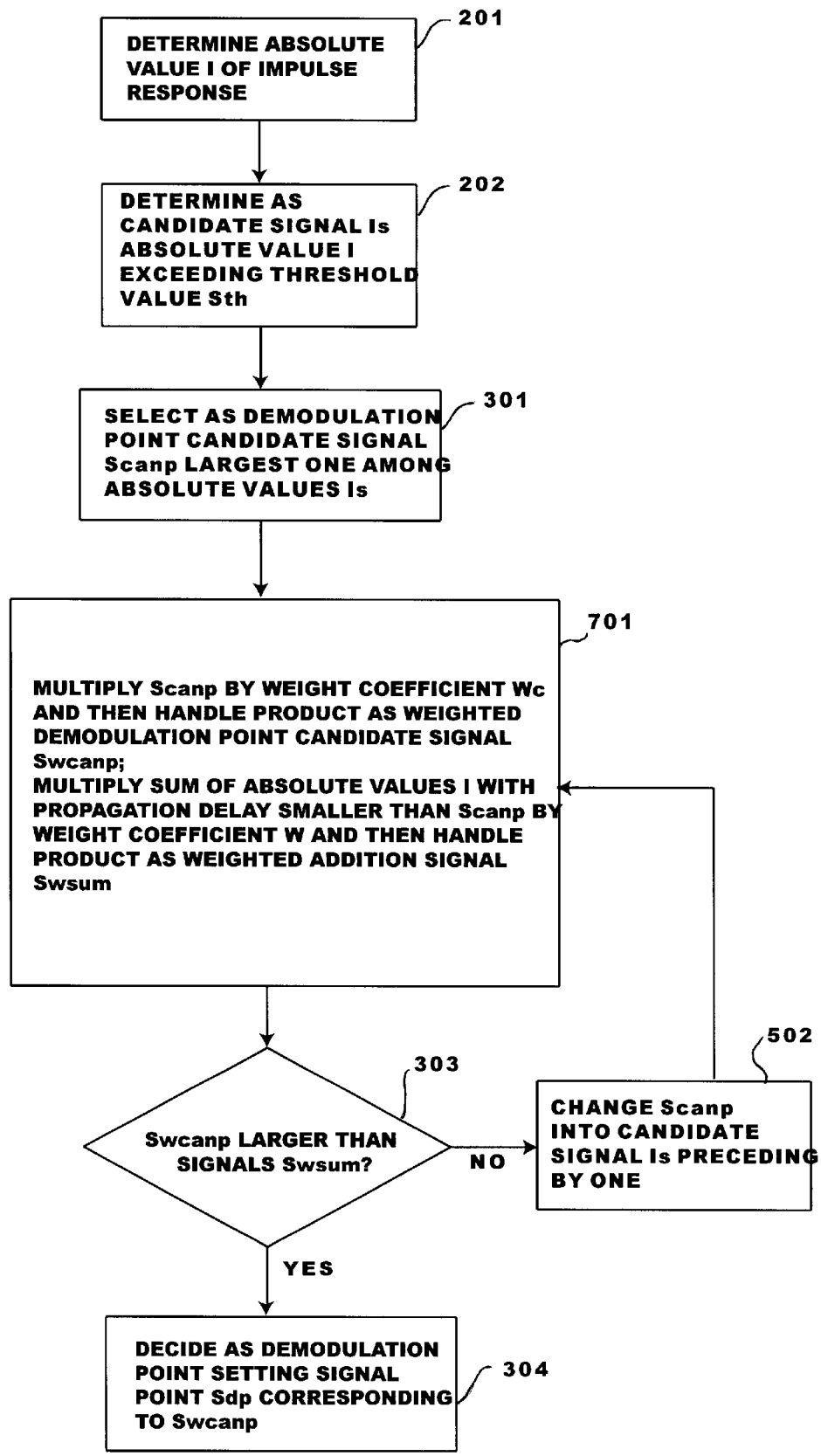
FIG. 8 is a flow chart showing a demodulation point setting procedure according to a seventh embodiment of the present invention.

FIG. 8 is a flowchart showing the demodulation point setting procedure in the demodulation point setting circuit 103 according to the seventh embodiment. For example, let us now consider the case where a demodulation point is decided to the received signal Sr with the absolute value I of an impulse response shown in FIG. 12 (step 201).

First, a received signal with the absolute value I exceeding the threshold value Sth is selected as a candidate signal Is (step 202). When the threshold value Sth is 0.6, the absolute values I4, I6, and I7 are selected. Next, the signal with the largest absolute value I6 among the selected absolute values is selected as a demodulation point candidate signal Scanp (step 301). Then, the weighted demodulation point candidate signal Swcanp obtained by multiplying the absolute value I6 by the weight coefficient Wc is compared with the weighted addition signal Swsum obtained by multiplying the sum 2.1 of the absolute values I1 to I5 by the weight coefficient W (steps 701 and 303).

If Wc=1.0 and W=0.6, Swcanp=1.0 and Swsum=1.26. Since Swsum is larger than Swcanp, Scanp is changed to the absolute value I4 preceding by one and exceeding the threshold value 5th (step 502). At this time, if Wc=1.0 and W=0.6, the sum of the absolute values I1 to I3 is 0.9 so that Swcanp=0.8 and Swsum=0.54. Since Swcanp is larger than Swsum, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

Figure 9:
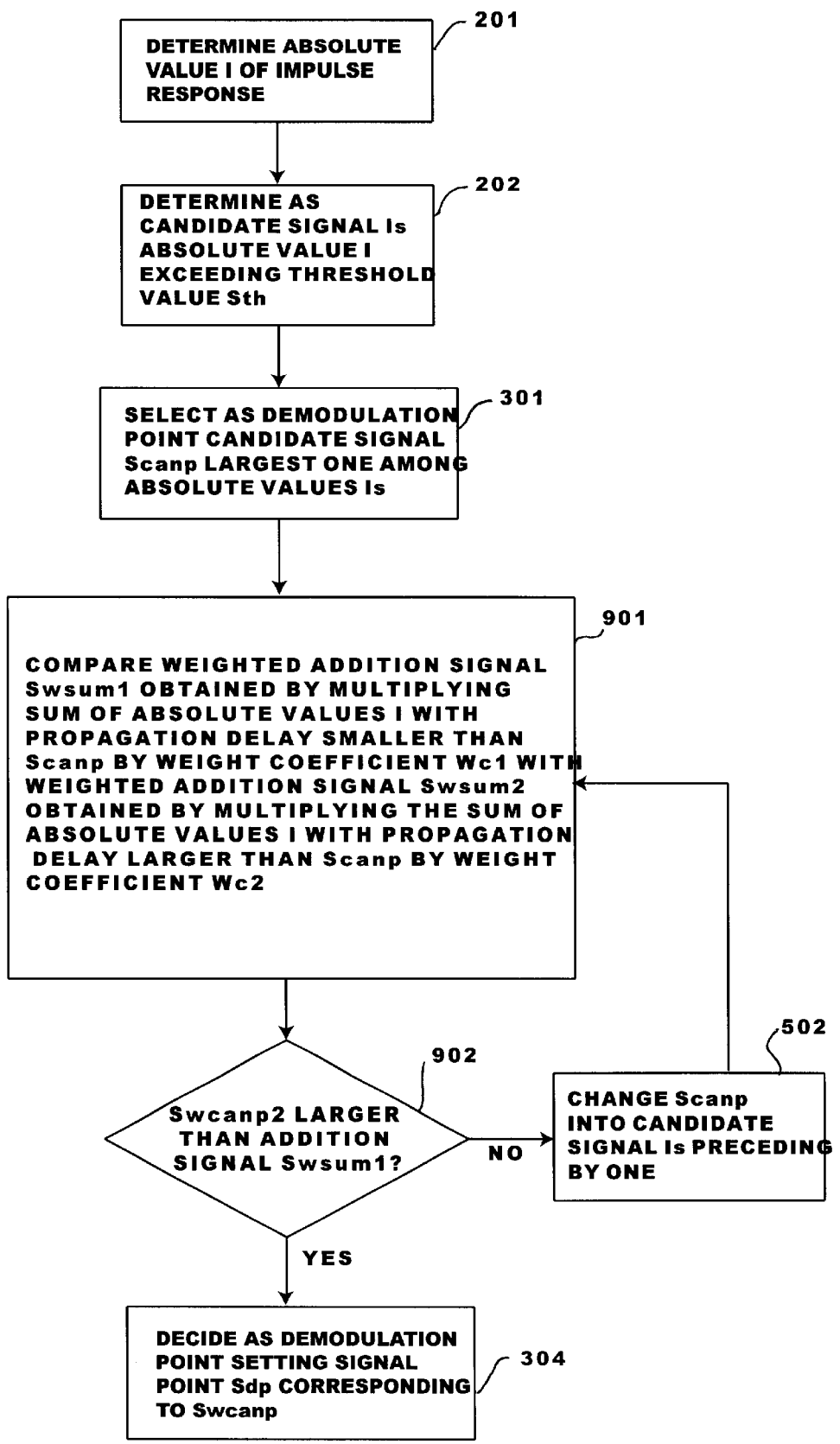
FIG. 9 is a flow chart a demodulation point setting procedure according to an eighth embodiment of the present invention.

FIG. 9 is a flowchart showing the demodulation point setting procedure in the demodulation point setting circuit 103 according to the eighth embodiment. For example, let us now consider the case where a demodulation point is decided to the received signal Sr with the absolute value I of an impulse response shown in FIG. 12 (step 201).

First, a received signal with the absolute value I exceeding the threshold value Sth is selected as a candidate signal Is (step 202). If the threshold value Sth is 0.6, the absolute values I4, I6, and I7 are selected. Next, the signal with the largest absolute value I6 among the selected absolute values is selected as a demodulation point candidate signal Scanp (step 301). Then, the weighted addition signal Swsum1 obtained by multiplying the sum 2.1 of the absolute values I1 to I5 by the weight coefficient Wc1 is compared with the weighted addition signal Swsum2 obtained by multiplying the sum 1.1 of the absolute values I7 to I10 by the weight coefficient Wc2 (steps 901 and 902).

If Wc1=1.0 and Wc2=0.6, Swsum1=2.1 and Swsum2=0.66. Since Swsum1 is larger than Swsum2, Scanp is changed to the absolute value I4 preceding by one and exceeding the threshold value Sth (step 502). At this time, when Wc1 =1.0 and Wc2=0.6, the sum of the absolute values I1 to I3 is 0.9 while the sum of the absolute values I5 to I10 is 2.5, so that Swsum1=0.9 and Ssum2=1.5. Since Swsum2 is larger than Swsum1, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

Figure 10:
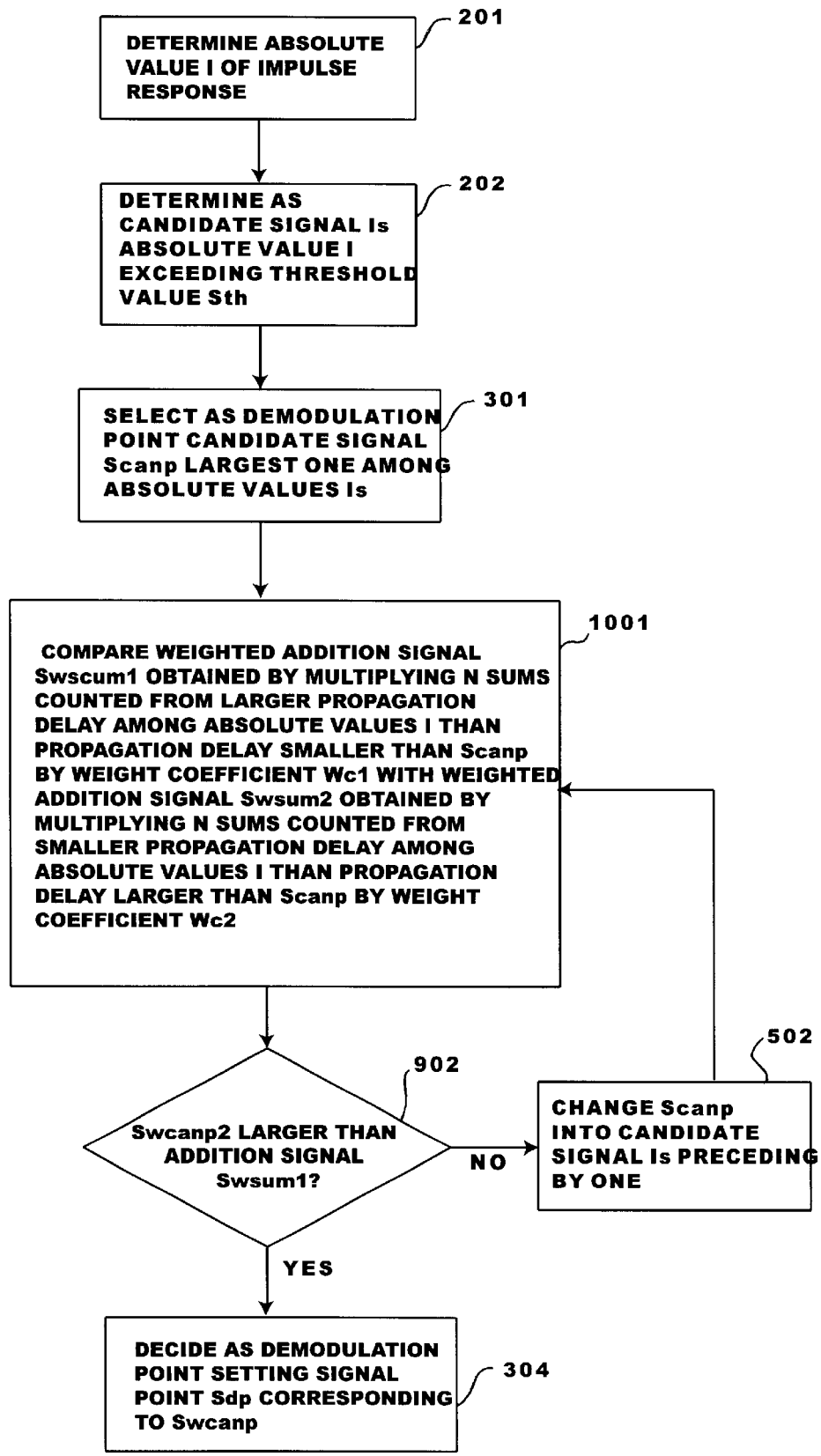
FIG. 10 is a flow chart showing a demodulation point setting procedure according to a ninth embodiment of the present invention.
Figure 11:
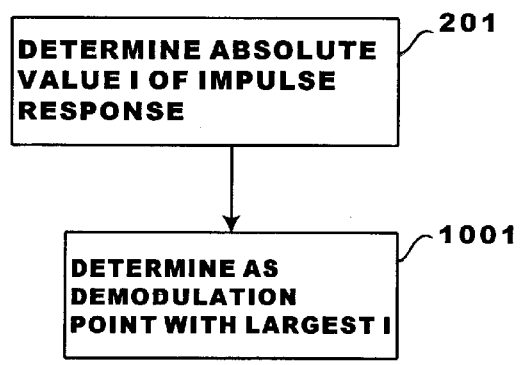
FIG. 11 is a flow chart showing a conventional demodulation point setting procedure.

FIG. 10 is a flowchart showing the demodulation point setting procedure in the demodulation point setting circuit 103 according to the ninth embodiment. For example, let us now consider the case where a demodulation point is decided to the received signal Sr with the absolute value I of an impulse response shown in FIG. 12 (step 201).

First, a received signal with the absolute value I exceeding the threshold value Sth is selected as a candidate signal Scanp (step 202). If the threshold value Sth is 0.6, the absolute values 14, 16, and I7 are selected. Next, the signal with the largest absolute value I6 among the selected absolute values is selected as a demodulation point candidate signal Scanp (step 301). It is now assumed that the addition range N is 3. The weighted addition signal Swsum1 obtained by multiplying the sum, 1.5, of absolute values 13 to 15 by the weight coefficient Wc1 is compared with the weighted addition signal Swsum2 obtained by multiplying the sum, 1.0, of the absolute values I7 to I9 by the weight coefficient group Wc2 (steps 1001 and 902).

If Wc1=1.0 and Wc2=0.6, Swsum1=1.5 and Swsum2= 0.6. Since Wsum1 is larger than Swsum2, Scanp is changed to the absolute value I4 preceding by one and exceeding the threshold value 5th (step 502).

At this time, if Wc=1.0 and Wc2=0.6, the sum of the absolute values I1 to I3 is 0.9 and the sum of the absolute values I5 to I7 is 2.1, so that Swsum1=0.9 while Swsum2= 1.26. Since Swsum2 is larger than Swsum1, the demodulation point setting signal Sdp is decided by selecting the point corresponding to the absolute value I4 as a demodulation point (step 304).

The above-described operation allows the configuration to reduce erroneous decision when estimated precursor tends to be susceptible to noises, thus realizing high-quality signal equalization.

As described above, the present invention can effectively realize high-quality signal equalization by reducing erroneous decision in the environment where a sequence candidate tends to be erroneously selected due to noises because the component corresponding to a demodulation point is close to the precursor component in magnitude.

The entire disclosure of Japanese Patent Application No. 9-196269 filed on Jul. 23, 1997 including specification, claims, drawing and summary are incorporated herein by reference in its entirety.

What is claimed is:

1. An automatic equalizer comprising:
   a decision unit that subjects N estimated received signals to a receive code decision and outputs a decision result as a decision output signal;
   an impulse response arithmetic circuit that outputs impulse response signals in response to received signals;
   a demodulation point setting circuit that outputs a demodulation point setting signal in response to the impulse response signals, the demodulation point setting signal being operative to shift a demodulation point from a point where the absolute value of the impulse response signals is maximized;
   a filter coefficient output circuit that outputs a first filter coefficient group and a second filter coefficient group in response to the impulse response signals and the demodulation point setting signal, the first filter coefficient group corresponding to a postcursor component in the impulse response signals, and the second filter coefficient group corresponding to a precursor component in the impulse response signals;
   a transversal filter that estimates a postcursor component of the received signals in response to the decision output signal and the first filter coefficient group that outputs an estimated postcursor signal;
   a transmission signal sequence generator that produces N transmission signal sequences;
   an estimated precursor circuit that estimates a precursor component of the received signals in response to the second filter coefficient group and the N transmission signal sequences and outputs N estimated precursor signals; and
   an adder for adding the estimated postcursor signal and each of the N estimated precursor signals to output the N estimated received signals.

2. The automatic equalizer defined in claim 1, wherein the decision circuit comprises:
   a subtracter operative to provide differences between the received signals and the N estimated received signals and to output N estimation error signals; and
   a minimum error decision unit that outputs as a decision output signal a part of a transmission signal sequence corresponding to an estimated received signal with a minimum absolute value among the N estimated received signals.

3. The automatic equalizer defined in claim 1, wherein the demodulation point setting circuit comprises:
   means for outputting response absolute value signals representing the absolute values of the impulse response signals;
   means for selecting a subset of candidate signals, the subset comprising the response absolute value signals having larger absolute values than a threshold value; and
   means for selecting as the demodulation points a point corresponding to a candidate signal having the smallest propagation delay.

4. The automatic equalizer defined in claim 1, wherein the demodulation point setting circuit comprises:
   means for outputting response absolute value signals representing the absolute values of the impulse response signals;
   means for selecting from among the response absolute value signals, the one having the largest absolute value as a demodulation point candidate signal;
   means for outputting a weighted demodulation point candidate signal by multiplying the demodulation point candidate signal by a first weighting coefficient;
   means for outputting a weighted subset of the response absolute value signals by multiplying a subset of response absolute value signals by respective second weighting coefficients, the subset of response absolute value signals comprising all the response absolute value signals having smaller propagation delays than the propagation delay of the demodulation point candidate signal; and means for:
comparing the weighted demodulation point candidate signal with the weighted subset of response absolute value signals, generating the demodulation point setting signal to confirm the point corresponding to the demodulation point candidate signal as the demodulation point when the weighted demodulation point candidate signal is larger than all of the signals of the weighted subset of response absolute value signals, and updating the demodulation point candidate signal by selecting the one of the subset of response absolute value signals having the largest propagation delay as a new demodulation point candidate signal, when the compared weighted demodulation point candidate signal is not larger than all of the signals of the weighted subset of response absolute value signals:

the demodulation point setting signal, the weighted demodulation point candidate signal, the subset of response absolute value signals and the weighted subset of response absolute value signals being recursively updated until a weighted demodulation point candidate signal has been identified that is larger than all of the signals of a corresponding updated weighted subset of response absolute value signals.

5. The automatic equalizer defined in claim 1, wherein:
the estimated precursor circuit provides the estimated precursor signals at a predetermined number of respective taps; and the demodulation point setting circuit comprises:
means for outputting response absolute value signals representing the absolute values of the impulse response signals;

means for selecting from among the response absolute value signals, the one having the largest absolute value as a demodulation point candidate signal;

means for outputting a weighted demodulation point candidate signal by multiplying the demodulation point candidate signal by a first weighting coefficient;

means for selecting a subset of response absolute value signals, the subset having one member less than the predetermined number of taps of the estimated precursor circuit, and the subset members comprising the response absolute value signals having the largest propagation delays less than that of the demodulation point candidate signal;

means for outputting a weighted subset of response absolute value signals by multiplying the subset of response absolute value signals by respective second weighting coefficients; and means for:
comparing the weighted demodulation point candidate signal with the weighted subset of response absolute value signals, generating the demodulation point setting signal to confirm the point corresponding to the demodulation point candidate signal as the demodulation point when the weighted demodulation point candidate signal is larger than all of the signals of the weighted subset of response absolute value signals, and updating the demodulation point candidate signal by selecting a member of the subset of response absolute value signals having the largest propagation delay less than that of the current demodulation point candidate signal as a new demodulation point candidate signal, when the compared weighted demodulation point candidate signal is not larger than all of the signals of the weighted subset of response absolute value signals;

the demodulation point setting signal, the weighted demodulation point candidate signal, the subset of response absolute value signals and the weighted subset of response absolute value signals being recursively updated until a weighted demodulation point candidate signal has been identified that is larger than all of the signals of a corresponding updated weighted subset of response absolute value signals.

6. The automatic equalizer defined in claim 1, wherein the demodulation point setting circuit comprises:

means for outputting response absolute value signals representing the absolute values of the impulse response signals;

means for selecting a subset of candidate signals comprising all of the response absolute value signals having absolute values larger than a threshold value;

means for selecting a signal from the subset of candidate signals that has the largest absolute value as a demodulation point candidate signal;

means for outputting a weighted demodulation point candidate signal by multiplying the demodulation point candidate signal by a first weighting coefficient;

means for outputting a weighted subset of response absolute value signals by multiplying a subset of response absolute value signals by respective second weighting coefficients, the subset of response absolute value signals comprising all the response absolute value signals having smaller propagation delays than the propagation delay of the demodulation point candidate signal; and means for:
comparing the weighted demodulation point candidate signal with the weighted subset of response absolute value signals, generating the demodulation point setting signal to confirm the point corresponding to the demodulation point candidate signal as the demodulation point when the weighted demodulation point candidate signal is larger than all of the signals of the weighted subset of response absolute value signals, and updating the demodulation point candidate signal by selecting a member of the subset of candidate signals having the largest propagation delay less than that of the compared weighted demodulation point candidate signal as a new demodulation point candidate signal, when the compared weighted demodulation point candidate signal is not larger than all of the signals of the weighted subset of response absolute value signals;

the demodulation point setting signal, the weighted demodulation point candidate signal, and the weighted subset of response absolute value signals being recursively updated until a weighted demodulation point candidate signal has been identified that is larger than all of the signals of the corresponding updated weighted subset of response absolute value signals.

7. The automatic equalizer defined in claim 1, wherein:
the estimated precursor circuit provides the estimated precursor signals at a predetermined number of respective taps; and the demodulation point setting circuit comprises:
- means for outputting response absolute value signals representing the absolute values of the impulse response signals;
- means for selecting a subset of candidate signals comprising all of the response absolute value signals having absolute values larger than a threshold value;
- means for selecting a signal from the subset of candidate signals that has the largest absolute value as a demodulation point candidate signal;
- means for outputting a weighted demodulation point candidate signal by multiplying the demodulation point candidate signal by a first weighting coefficient;
- means for selecting a subset of response absolute value signals, the subset having one less member than the predetermined number of taps of the estimated precursor circuit, and the subset members comprising the response absolute value signals having the largest propagation delays less than that of the demodulation point candidate signal;
- means for outputting a weighted subset of response absolute value signals by multiplying the subset of response absolute value signals by respective second weighting coefficients; and
- means for:
  - comparing the weighted demodulation point candidate signal with the weighted subset of response absolute value signals,
  - generating the demodulation point setting signal to confirm the point corresponding to the demodulation point candidate signal as the demodulation point when the weighted demodulation point candidate signal is larger than all of the signals of the weighted subset of response absolute value signals, and
  - updating the demodulation point candidate signal by selecting the one of the subset of candidate signals having the largest propagation delay less than that of the current demodulation point candidate signal as a new demodulation point candidate signal, when the compared weighted demodulation point candidate signal is not larger than all of the signals of the weighted subset of response absolute value signals;
- the demodulation point setting signal, the weighted demodulation point candidate signal, the subset of response absolute value signals, and the weighted subset of response absolute value signals being recursively updated until a weighted demodulation point candidate signal has been identified that is larger than all of the signals of the corresponding updated weighted subset of response absolute value signals.

8. The automatic equalizer defined in claim 1, wherein the demodulation point setting circuit comprises:
- means for outputting response absolute value signals representing the absolute values of the impulse response signals;
- means for selecting from among the response absolute value signals, the one having the largest absolute value as a demodulation point candidate signal;
- means for outputting a weighted demodulation point candidate signal by multiplying the demodulation point candidate signal by a first weighting coefficient;
- means for outputting a weighted addition signal by multiplying a sum of a subset of the response absolute value signals by a second weighting coefficient, the subset of response absolute value signals comprising all of the response absolute value signals having a smaller propagation delay than that of the demodulation point candidate signal; and
- means for:
  - comparing the weighted demodulation point candidate signal with the weighted addition signal,
  - generating the demodulation point setting signal to confirm the point corresponding to the demodulation point candidate signal as the demodulation point when the weighted demodulation point candidate signal is larger than the weighted addition signal, and
  - updating the demodulation point candidate signal by selecting the one of the subset of response absolute value signals having the largest propagation delay as a new demodulation point candidate signal, when the compared weighted demodulation point candidate signal is not larger than the weighted addition signal;
- the demodulation point setting signal, the weighted demodulation point candidate signal, the subset of response absolute value signals and the weighted addition signal being recursively updated until a weighted demodulation point candidate signal has been identified that is larger than the weighted addition signal.

9. The automatic equalizer defined in claim 1, wherein the demodulation point setting circuit comprises:
- means for outputting response absolute value signals representing the absolute values of the impulse response signals;
- means for selecting a subset of candidate signals comprising all of the response absolute value signals having absolute values larger than a threshold value;
- means for selecting a signal from the subset of candidate signals that has the largest absolute value as a demodulation point candidate signal;
- means for outputting a weighted demodulation point candidate signal by multiplying the demodulation point candidate signal by a first weighting coefficient;
- means for outputting a weighted addition signal by multiplying a sum of a subset of the response absolute value signals by a second weighting coefficient, the subset of response absolute value signals comprising all of the response absolute value signals having a smaller propagation delay than that of the demodulation point candidate signal; and
- means for:
  - comparing the weighted demodulation point candidate signal with the weighted addition signal,
  - generating the demodulation point setting signal to confirm the point corresponding to the demodulation point candidate signal as the demodulation point when the weighted demodulation point candidate signal is larger than the weighted addition signal, and
  - updating the demodulation point candidate signal by selecting a member of the subset of candidate signals having the largest propagation delay as a new demodulation point candidate signal, when the compared weighted demodulation point candidate signal is not larger than the weighted addition signal;
- the demodulation point setting signal, the weighted demodulation point candidate signal, the subset of response absolute value signals and the weighted addition signal being recursively updated until a weighted demodulation point candidate signal has been identified that is larger than the weighted addition signal.

10. The automatic equalizer defined in claim 1, wherein the demodulation point setting circuit comprises:

means for outputting response absolute value signals representing the absolute values of the impulse response signals;

means for selecting a subset of candidate signals comprising all of the response absolute value signals having absolute values larger than a threshold value;

means for selecting a signal from the subset of candidate signals that has the largest absolute value as a demodulation point candidate signal;

means for outputting a first weighted addition signal by multiplying a sum of a first subset of the response absolute value signals by a first weighting coefficient, the first subset of response absolute value signals comprising all of the response absolute value signals having a smaller propagation delay than that of a demodulation point candidate signal;

means for outputting a second weighted addition signal by multiplying the sum of a second subset of the response absolute value signals by a second weighting coefficient, the second subset of response absolute value signals comprising all of the response absolute value signals having a larger propagation delay than that of the demodulation point candidate signal; and means for:

comparing the first weighted addition signal with the second weighted addition signal, generating the demodulation point setting signal to confirm the point corresponding to the demodulation point candidate signal as the demodulation point when the second weighted addition signal is larger than the first weighted addition signal, and updating the demodulation point candidate signal by selecting a member of the subset of response absolute value signals having the largest propagation delay smaller than that of the current demodulation point candidate signal as a new demodulation point candidate signal, when the second weighted addition signal is not larger than the first weighted addition signal;

the demodulation point candidate signal, the first and second subsets of response absolute value signals and the first and second weighted addition signals being recursively updated until a weighted demodulation point candidate signal has been identified for which the second weighted addition signal is larger than the first weighted addition signal.

11. The automatic equalizer defined in claim 1, wherein the demodulation point setting circuit comprises:

means for outputting response absolute value signals representing the absolute values of the impulse response signals;

means for selecting a subset of candidate signals comprising all of the response absolute value signals having absolute values larger than a threshold value;

means for selecting a signal from the subset of candidate signals that has the largest absolute value as a demodulation point candidate signal;

means for outputting a first weighted addition signal by multiplying the sum of a first subset of the response absolute value signals by a first weighting coefficient, the first subset of response absolute value signals comprising a specified number of the response absolute value signals having successively smaller propagation delays than that of the demodulation point candidate signal;

means for outputting a second weighted addition signal by multiplying a sum of a second subset of the response absolute value signals by a second weighting coefficient, the second subset of response absolute value signals comprising the specified number of the response absolute value signals having successively larger propagation delays than that of the demodulation point candidate signal; and means for:

comparing the first weighted addition signal with the second weighted addition signal, generating the demodulation point setting signal to confirm the point corresponding to the demodulation point candidate signal as the demodulation point when the second weighted addition signal is larger than the first weighted addition signal, and updating the demodulation point candidate signal by selecting a member of the subset of candidate signals having the largest propagation delay smaller than that of the current demodulation point candidate signal as a new demodulation point candidate signal, when the second weighted addition signal is not larger than the first weighted addition signal;

the demodulation point candidate signal, the first weighted addition signal, and the second weighted addition signal being recursively updated until a weighted demodulation point candidate signal has been identified for which the second weighted addition signal is larger than the first weighted addition signal.

* * * * *